Patented Apr. 27, 1937

2,078,404

UNITED STATES PATENT OFFICE 2,078,404

METHOD OF EXTRACTING LIVER OIL

Carl Nielsen, Lake Bluff, Ill., assignor to Abbott Laboratories, North Chicago, Ill., a corporation of Illinois No Drawing. Application December 29, 1931, Serial No. 583,791. Renewed July 31, 1935

8 Claims. (Cl. 87—6)

My invention relates to a new article of commerce of high therapeutic value, and has to do more particularly with an improved oil produced from livers of fish and the like. An object of my invention is to produce an improved article of the type referred to, in a simple convenient, expeditious and economical way.

My improved product may be used to supplement the diet of infants and adults, so as to prevent and cure dietary deficiency diseases and to promote growth and normal metabolism, similarly to the well known therapeutic use of cod liver oil and like materials.

It has been known for some time that the liver oil of halibut exceeds other fish oils in vitamin A content, such as the liver oils of salmon, red perch, mackerel, and porbeagle, and of the whale, although these have also been found to yield, by extraction with solvents, products which show fairly strong Lovibond color reactions. (Biochem. Journal, vol. 23, II, 1929.) However, by my process, I am able to obtain from the livers of such fish oils which show much higher vitamin A values than any previously reported, and I have discovered that some of these oils—particularly that from halibut livers—are exceedingly rich in vitamin D at the same time.

According to my improved process, the livers of the fish, preferably, of the halibut, are steamed at about seventy to eighty degrees centigrade, with stirring for about thirty to forty-five minutes. The aqueous liquid thus obtained is poured and drained off while hot and is discarded. The residue is cooled rapidly, preferably to about minus 10° F. or lower, in closed containers, protected from oxidation by a layer of paraffin or $CO_2$ gas, and the cold residue is extracted with a sufficient, usually equal, volume of peroxide—free diethyl ether or other suitable solvent. The extract thus obtained is filtered through paper and evaporated in vacuo. The solvent is preferably recovered for re-use and the liver residue is re-extracted.

The oil thus extracted is found to have remarkably high values in its content of vitamins A and D. Thus, while the halibut liver oil obtained according to the article cited above was said to have 25,000 units of vitamin A, the product obtained by my above-described method shows at least twice as high a vitamin A potency, or about 50,000 units per gram. It is about one hundred times as potent in vitamin A content as average cod liver oil, and has about twenty-five times the value of vitamin D as average cod liver oil, or about 333 vitamin D units (Steenbock) per gram.

By the same method, I have been able to prepare liver oil from red salmon containing 12,500 vitamin A units and 200 vitamin D units (Steenbock) per gram. These vitamin A and D potencies are, to my knowledge, higher than have ever before been obtained in salmon liver oils.

The improved results obtained by my process are thought to be largely due to the combined effects of the steam and solvent treatment. The steam enters directly into the mass and is uniformly distributed in it, thus insuring a uniform temperature throughout the mass. This cannot be obtained by ordinary boiling where the layers close to the heat source will have a higher temperature than those closer to the center of the container. By steaming and stirring, the liver cells are uniformly broken up and the proteins uniformly coagulated, while the oil, thus exposed, and its vitamins at the same time are better protected against oxidation since air is virtually excluded in the mass by the uniformly distributed steam, whereas by ordinary boiling air is continually introduced into the mass from the outside. The steam-treated material is thus in an ideal condition for solvent extraction, and this probably explains my vastly improved results, set forth above.

Since there is a definite interrelationship between all nutritional factors, and since the fullest benefit from them can be obtained only from liberal and proportionate amounts, halibut liver oil offers advantages over all the natural vitamin A and D sources heretofore discovered, as well as all concentrates prepared therefrom, because its vitamin A potency can be adjusted by dilution to any desired degree below the range of 100 to 125 times that of cod liver oil, and by increasing the anti-rachitic potency of this oil to the desired point, a protective and curative amount of vitamin D units can be supplied in a few drops once a day, furnishing simultaneously a proportionate amount of vitamin A. The increased anti-rachitic effect can be adjusted by the addition of standardized amounts of vitamin D, or viosterol, or any oil-soluble factor of anti-rachitic value. I prefer a product adjusted so that three minims are equal in vitamin A potency to three teaspoonfuls of cod liver oil and at the same time equal in vitamin D units to the recognized protective daily dose to a child (3 minims) of viosterol 250 D.

Various changes and modifications in the above-described method will doubtless suggest themselves to those skilled in the art, and hence I do not wish to be limited to the specific method described above or uses mentioned, except to the extent indicated by the appended claims, which are to be interpreted as broadly as the state of the art will permit.

The term "natural liver oil" as used herein means that the natural potency of the material is not artificially raised, as by irradiation.

I claim as my invention:

1. A method of preparing oil of the class described, comprising steaming livers of fish or the like at a temperature not substantially greater than about 100° C., discarding the aqueous liquid thus produced, cooling the material to a temperature below freezing, extracting the oil from the residue by means of an organic solvent, and subsequently removing the solvent from the oil thus extracted, the steaming being done in such a manner as to substantially exclude air, and the material being protected from oxidation during the cooling step.

2. A method of preparing halibut liver oil, comprising steaming halibut livers at a temperature not substantially greater than 100° C., discarding the aqueous liquid thus produced, cooling the residue to a temperature below freezing while protecting the same from oxidation, extracting the material with an organic solvent, and subsequently removing the solvent from the oil thus extracted.

3. A method of preparing oil of the class described comprising steaming livers of fish or the like at a temperature not substantially greater than about one hundred degrees centigrade discarding the aqueous liquid thus produced, rapidly cooling to a temperature below freezing, then extracting the oil from the residue by means of an organic solvent and subsequently removing the solvent from the oil thus extracted.

4. A method of preparing oil of the class described comprising steaming livers of fish or the like at a temperature not substantially greater than about one hundred degrees centigrade discarding the aqueous liquid thus produced, rapidly cooling to about minus ten degrees Fahrenheit, then extracting the oil from the residue by means of an organic solvent and subsequently removing the solvent from the oil thus extracted.

5. A method of preparing oil of the class described comprising steaming livers of fish or the like at a temperature not substantially greater than about one hundred degrees centigrade discarding the aqueous liquid thus produced, rapidly cooling the residue to a temperature below freezing while protecting the same from oxidation, then extracting the oil from the residue by means of an organic solvent and subsequently removing the solvent from the oil thus extracted.

6. A method of preparing oil of the class described comprising steaming livers of fish or the like at a temperature not substantially greater than about one hundred degrees centigrade discarding the aqueous liquid thus produced, rapidly cooling the residue to about minus ten degrees Fahrenheit while protecting the same from oxidation, then extracting the oil from the residue by means of an organic solvent and subsequently removing the solvent from the oil thus extracted.

7. A method of preparing halibut liver oil comprising steaming halibut livers at a temperature not substantially greater than about one hundred degrees centigrade discarding the aqueous liquid thus produced, rapidly cooling to a temperature below freezing, then extracting the oil from the residue by means of an organic solvent and subsequently removing the solvent from the oil thus extracted.

8. A method of preparing salmon liver oil comprising steaming salmon livers at a temperature not substantially greater than about one hundred degrees centigrade discarding the aqueous liquid thus produced, rapidly cooling to a temperature below freezing, then extracting the oil from the residue by means of an organic solvent and subsequently removing the solvent from the oil thus extracted.

CARL NIELSEN.